United States Patent
Waun

(10) Patent No.: US 11,015,480 B2
(45) Date of Patent: May 25, 2021

(54) FEED FORWARD LOAD SENSING FOR HYBRID ELECTRIC SYSTEMS

(71) Applicant: General Electric Company, Schenectady, NY (US)

(72) Inventor: Scott Douglas Waun, Loveland, OH (US)

(73) Assignee: General Electric Company, Schenectady, NY (US)

( * ) Notice: Subject to any disclaimer, the term of this patent is extended or adjusted under 35 U.S.C. 154(b) by 358 days.

(21) Appl. No.: 16/106,154

(22) Filed: Aug. 21, 2018

(65) Prior Publication Data

US 2020/0063599 A1    Feb. 27, 2020

(51) Int. Cl.
*F01D 21/14*    (2006.01)
*F01D 15/10*    (2006.01)
*F02C 9/26*    (2006.01)
*B64D 27/02*    (2006.01)

(52) U.S. Cl.
CPC .............. *F01D 21/14* (2013.01); *B64D 27/02* (2013.01); *F01D 15/10* (2013.01); *F02C 9/26* (2013.01); *B64D 2027/026* (2013.01); *F05D 2220/323* (2013.01); *F05D 2220/76* (2013.01); *F05D 2270/335* (2013.01)

(58) Field of Classification Search
CPC ......... F01D 15/10; F01D 21/14; B64D 27/02; B64D 2027/026; F02C 9/26; F05D 2220/76; F05D 2220/323; F05D 2270/335
USPC .............................................. 290/40 B, 40 C
See application file for complete search history.

(56) References Cited

U.S. PATENT DOCUMENTS

| | | |
|---|---|---|
| 4,104,876 A | 8/1978 | Larsen et al. |
| 4,625,123 A | 11/1986 | Gillett et al. |
| 4,695,221 A | 9/1987 | Swearingen |
| 5,480,107 A | 1/1996 | Bacon |
| 5,635,768 A | 6/1997 | Birch et al. |
| 5,808,367 A * | 9/1998 | Akagi ..................... H02P 9/305 290/40 C |
| 6,401,446 B1 | 6/2002 | Gibbons |
| 6,625,504 B2 | 9/2003 | Landreth |
| 6,777,822 B1 | 8/2004 | Suttie et al. |
| 6,787,933 B2 | 9/2004 | Claude et al. |
| 6,881,027 B2 | 4/2005 | Klaas et al. |
| 7,188,475 B2 | 3/2007 | McGinley et al. |

(Continued)

*Primary Examiner* — Pedro J Cuevas
(74) *Attorney, Agent, or Firm* — Dority & Manning, P.A.

(57) ABSTRACT

Hybrid electric systems and methods therefore are provided. In one exemplary aspect, a hybrid electric system includes an engine, an electric machine operatively coupled thereto and configured to generate electrical power when driven by the engine. One or more electrical loads are electrically connectable with the electric machine. An engine controller of the engine receives load state data indicative of electrical loads that anticipate electrically disconnecting from or electrically connecting to the electric machine at a predetermined time. In this way, the engine controller can anticipate electrical load changes and the engine can be controlled to adjust its torque output in anticipation of the electrical load change. In another exemplary aspect, a hybrid electric system is provided that includes features for nearly instantaneously reacting to load changes on the engine based on load state data received from feed forward inputs of the electrical system of the hybrid electric system.

20 Claims, 9 Drawing Sheets

(56) References Cited

U.S. PATENT DOCUMENTS

| | | |
|---|---|---|
| 7,251,942 B2 | 8/2007 | Dittmar et al. |
| 7,340,901 B2 | 3/2008 | Riley |
| 7,356,402 B2 * | 4/2008 | Kuroda ................ B60W 20/00 |
| | | 701/102 |
| 7,367,193 B1 | 5/2008 | Thompson |
| 7,383,902 B2 * | 6/2008 | Matsuzaki .......... B60L 15/2009 |
| | | 180/65.285 |
| 7,704,110 B2 | 4/2010 | Wiatrowski et al. |
| 7,707,838 B2 | 5/2010 | Sheldon et al. |
| 7,725,236 B2 | 5/2010 | Delaloye et al. |
| 7,748,209 B1 | 7/2010 | Schopf et al. |
| 7,812,468 B2 * | 10/2010 | Kuroda ................... H02P 9/102 |
| | | 290/40 C |
| 7,975,465 B2 | 7/2011 | Morris et al. |
| 8,127,548 B2 | 3/2012 | Anson et al. |
| 8,261,527 B1 | 9/2012 | Stearns et al. |
| 8,286,432 B2 | 10/2012 | Anson |
| 8,310,076 B2 | 11/2012 | Jones et al. |
| 8,321,119 B2 | 11/2012 | Van Vactor et al. |
| 8,549,833 B2 | 10/2013 | Hyde et al. |
| 8,622,342 B2 | 1/2014 | Filho |
| 8,657,227 B1 | 2/2014 | Bayliss et al. |
| 8,825,237 B2 | 9/2014 | Covington et al. |
| 9,008,942 B2 | 4/2015 | Dyrla et al. |
| 9,048,765 B2 * | 6/2015 | Dobbs ................ F02D 41/0007 |
| 9,096,222 B2 * | 8/2015 | Kim ....................... B60K 6/442 |
| 9,154,067 B2 * | 10/2015 | Frampton ................ H02P 9/00 |
| 9,267,437 B2 | 2/2016 | Perry et al. |
| 9,267,438 B2 | 2/2016 | Dooley et al. |
| 9,267,480 B1 | 2/2016 | Luyks |
| 9,303,566 B2 | 4/2016 | Haillot |
| 9,366,182 B2 | 6/2016 | Rodriguez |
| 9,404,419 B2 | 8/2016 | Haillot |
| 9,458,770 B2 | 10/2016 | Anghel et al. |
| 9,494,085 B2 | 11/2016 | Cai |
| 9,586,690 B2 | 3/2017 | Rajashekara et al. |
| 9,689,316 B1 | 6/2017 | Crom |
| 9,751,521 B2 * | 9/2017 | Schwartz ............. B60W 10/26 |
| 9,815,450 B2 | 11/2017 | Kim |
| 9,914,536 B2 | 3/2018 | Rossotto |
| 10,215,665 B2 * | 2/2019 | Escobedo Hernandez ................. |
| | | G01M 15/14 |
| 10,625,729 B2 * | 4/2020 | Schwartz ............. B60W 40/02 |
| 10,770,996 B1 * | 9/2020 | Waun ..................... F02D 29/06 |
| 2002/0195821 A1 | 12/2002 | Wacknov |
| 2004/0163860 A1 * | 8/2004 | Matsuzaki ............. B60L 15/20 |
| | | 180/65.225 |
| 2004/0164616 A1 * | 8/2004 | Obayashi .................. B60T 1/10 |
| | | 307/18 |
| 2006/0113799 A1 * | 6/2006 | Obayashi ............. F02B 37/005 |
| | | 290/40 B |
| 2006/0271257 A1 * | 11/2006 | Kuroda .................. B60K 6/485 |
| | | 701/36 |
| 2007/0018035 A1 | 1/2007 | Saiz et al. |
| 2007/0157910 A1 * | 7/2007 | Obayashi .................. H02P 9/48 |
| | | 123/559.1 |
| 2009/0261599 A1 * | 10/2009 | Alston ..................... H02P 9/04 |
| | | 290/40 B |
| 2009/0302152 A1 | 12/2009 | Knight |
| 2013/0227950 A1 | 9/2013 | Anderson et al. |
| 2014/0015257 A1 * | 1/2014 | Dobbs ................ F02D 41/0007 |
| | | 290/40 B |
| 2014/0145028 A1 | 5/2014 | Gomez |
| 2014/0155222 A1 * | 6/2014 | Kim ....................... F16D 48/06 |
| | | 477/5 |
| 2014/0260306 A1 | 9/2014 | Dooley et al. |
| 2015/0069858 A1 * | 3/2015 | Frampton ................. H02J 3/44 |
| | | 307/127 |
| 2015/0089921 A1 | 4/2015 | Rideau et al. |
| 2015/0180280 A1 * | 6/2015 | Frampton ................. H02J 9/08 |
| | | 307/53 |
| 2015/0214864 A1 * | 7/2015 | Sopko ....................... H02P 5/52 |
| | | 318/3 |
| 2015/0337740 A1 | 11/2015 | Heiberger et al. |
| 2016/0053690 A1 | 2/2016 | Perkinson et al. |
| 2016/0153326 A1 | 6/2016 | Muller et al. |
| 2016/0229513 A1 | 8/2016 | Scheel et al. |
| 2016/0305313 A1 * | 10/2016 | Kumar ..................... F02D 41/30 |
| 2017/0320585 A1 | 11/2017 | Armstrong et al. |
| 2017/0322116 A1 * | 11/2017 | Escobedo Hernandez ................. |
| | | F01K 23/101 |
| 2018/0057173 A1 | 3/2018 | Sautron |
| 2020/0007060 A1 * | 1/2020 | Hashimoto ............. H02P 21/28 |
| 2020/0063599 A1 * | 2/2020 | Waun ..................... B60L 1/003 |
| 2020/0370504 A1 * | 11/2020 | Mook ....................... F02G 1/05 |
| 2020/0389106 A1 * | 12/2020 | Waun ....................... H02P 9/04 |

* cited by examiner

FEED FORWARD LOAD SENSING FOR HYBRID ELECTRIC SYSTEMS

FIELD

The present subject matter relates generally to hybrid electric systems and methods for operating the same.

BACKGROUND

Hybrid electric propulsion systems may be used for a wide variety of application and in many industries. For instance, hybrid electric systems may be used for power generation, for propulsion of an aerial vehicle, for powering marine vessels and automotive vehicles, as well as other applications. For example, hybrid electric propulsion systems for aerial vehicles typically include a combustion engine or other mechanically driven powerplant that drives a generator to produce electrical power. The combustion engine may also drive a source of thrust for the aerial vehicle, such as a propeller or fan. The electrical power generated by the generator may be utilized to drive an additional source of thrust. For instance, the electrical power may be provided to an electric motor that utilizes the electrical power to drive the additional thrust source, such as a propeller or fan on the other side of the aerial vehicle. The electrical power generated by the generator may also be utilized to power one or more electrical loads of the aerial vehicle, such as an air conditioning unit.

When one or more electrical loads applying a torque load on the engine cease demanding electrical power or are electrically disconnected from the system, the electrical load on the engine decreases. That is, the torque load on the engine decreases. When this occurs, a torque imbalance between the torque output of the engine and the torque load placed on the engine by the electrical system results. This may cause speed excursions of the engine and the generator potentially leading to overspeed issues, poor power quality (e.g., system overvoltage), and increased engine temperature, which may affect the life of the engine. Moreover, rapid electrical load changes may cause significant and unsafe aircraft handling issues and thrust asymmetry.

Conventionally, the torque imbalance between the torque load on the engine and the torque output of the engine is not sensed until the resulting speed excursion occurs. When the torque load on the engine is out of balance with the torque output of the engine, the engine speed is adjusted to balance the torques. While the torques eventually become balanced with such conventional approaches, the torques may become significantly imbalanced when an electrical load change occurs, and as noted above, a plethora of problems may result as a consequence of the imbalanced torques.

Accordingly, a hybrid electric systems and methods therefore that address one or more of the challenges noted above would be useful.

BRIEF DESCRIPTION

Aspects and advantages of the invention will be set forth in part in the following description, or may be obvious from the description, or may be learned through practice of the invention.

In one aspect, the present disclosure is directed to a hybrid electric system. The hybrid electric system includes an engine configured to generate a torque output. The hybrid electric system also includes an electric machine operatively coupled with the engine and configured to generate electrical power when driven by the engine. Further, the hybrid electric system includes one or more electrical loads selectively electrically connectable with the electric machine and configured to receive electrical power from the electric machine when electrically connected thereto. Moreover, the hybrid electric system includes an engine controller configured to control the engine and communicatively coupled with the one or more electrical loads, the engine controller configured to: receive load state data associated with the one or more electrical loads; determine, based on the load state data, whether a load change on the engine is anticipated; and generate a control command based at least in part on whether the load change on the engine is anticipated.

In some embodiments, the control command is representative of instructions for changing the torque output of the engine.

In some further embodiments, the engine controller is further configured to: communicate the control command to one or more components of the engine for changing the torque output of the engine.

In some embodiments, the one or more components of the engine comprise a fuel control device configured to selectively control a fuel flow to the engine, and wherein the control command includes instructions for controlling the fuel control device to selectively control the fuel flow to the engine.

In some embodiments, if the load change anticipated on the engine is a load decrease, the control command communicated to the one or more components of the engine includes instructions for controlling the fuel control device to reduce the fuel flow to the engine.

In some embodiments, the load state data comprises a runtime indicator indicative of a predetermined time in which at least one of the one or more electrical loads of the hybrid electric system anticipate electrically connecting to or disconnecting from the electric machine.

Further, In some embodiments, the engine controller is further configured to: access a database that associates each electrical load of the hybrid electric system that is electrically connectable with the electric machine with an associated load; and ascertain the associated load associated with the at least one of the one or more electrical loads that is anticipated to be electrically connected to or disconnected from the electric machine. In such embodiments, the control command is generated based at least in part on the associated load associated with the at least one of the one or more electrical loads that is anticipated to be electrically connected to or disconnected from the electric machine.

In some embodiments, the load state data associated with the one or more electrical loads is sensed by sensing devices associated with the one or more electrical loads.

Moreover, in some embodiments, the hybrid electric system is a hybrid electric propulsion system for an aircraft.

In some embodiments, the one or more electrical loads comprise a second electric machine, and wherein the hybrid electric propulsion system for the aircraft comprises: a first propulsor operatively coupled with the engine and configured to produce thrust for the aircraft when driven by the engine; and a second propulsor operatively coupled with the second electric machine and configured to produce thrust for the aircraft when driven by the second electric machine.

In another aspect, the present disclosure is directed to a method for operating a hybrid electric system. The method includes receiving, by an engine controller of an engine, load state data associated with one or more electrical loads that are selectively electrically connectable with an electric machine operatively coupled with the engine, the electric machine being configured to generate electrical power when driven by the engine. The method also includes determining, by the engine controller, whether a load change on the engine is either anticipated or present based at least in part on the load state data. Moreover, the method includes controlling, by the engine controller, a torque output of the engine based at least in part on whether the load change on the engine is either anticipated or present.

In some implementations, controlling, by the engine controller, the torque output of the engine based at least in part on whether the load change on the engine is either anticipated or present comprises adjusting a fuel flow to the engine.

In some implementations, the fuel flow to the engine is reduced prior to the load change on the engine.

In some implementations, the hybrid electric system is a hybrid electric propulsion system for an aircraft, and wherein the one or more electrical loads comprise a circuit breaker and an aircraft system load selectively electrically connectable with the circuit breaker, and wherein the load state data of the aircraft system load is sensed at the circuit breaker.

In some implementations, the load state data comprises a runtime indicator indicative of a predetermined time in which at least one of the one or more electrical loads of the hybrid electric system anticipate increasing or decreasing to a power level consumption level that exceeds a predetermined threshold, and wherein the torque output of the engine is controlled based at least in part on whether the at least one of the one or more electrical loads anticipates increasing or decreasing to the power level consumption level that exceeds the predetermined threshold.

In a further aspect, the present disclosure is directed to a system. The system includes an engine configured to generate a torque output and an electric machine mechanically coupled with the engine and configured to generate electrical power when driven by the engine. Further, the system includes one or more electrical loads selectively electrically connectable with the electric machine and configured to receive electrical power therefrom when electrically connected. Moreover, the system includes an engine controller configured for controlling the engine, the engine controller communicatively coupled with the one or more electrical loads, the engine controller configured to: receive load state data associated with the one or more electrical loads; determine, based on the load state data, whether a load change on the engine is present; and generate a control command based at least in part on whether the load change on the engine is present.

In some embodiments, the control command is representative of instructions for changing the torque output of the engine, and wherein the engine controller is further configured to: communicate the control command to the engine.

In some embodiments, the engine controller is further configured to: calculate, based on load state data from a previous time step, a baseline toque load on the engine; calculate, based on the load state data from a current time step, a current toque load on the engine; and determine the load change on the engine based at least in part on the baseline torque load and the current torque load on the engine.

In some embodiments, the load state data comprises a change indicator indicative of at least one of the one or more electrical loads of the system that have been electrically connected to or disconnected from the electric machine within a predetermined interval, and wherein the control command is generated based at least in part on the change indicator.

In some embodiments, the one or more electrical loads comprise a circuit breaker electrically coupled with at least one other electrical load of the one or more electrical loads, the circuit breaker comprising at least one breaker switch associated with the at least one other electrical load of the one or more electrical loads, and wherein the load state data associated with the one other of the one or more electrical loads is sensed at the at least one breaker switch.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
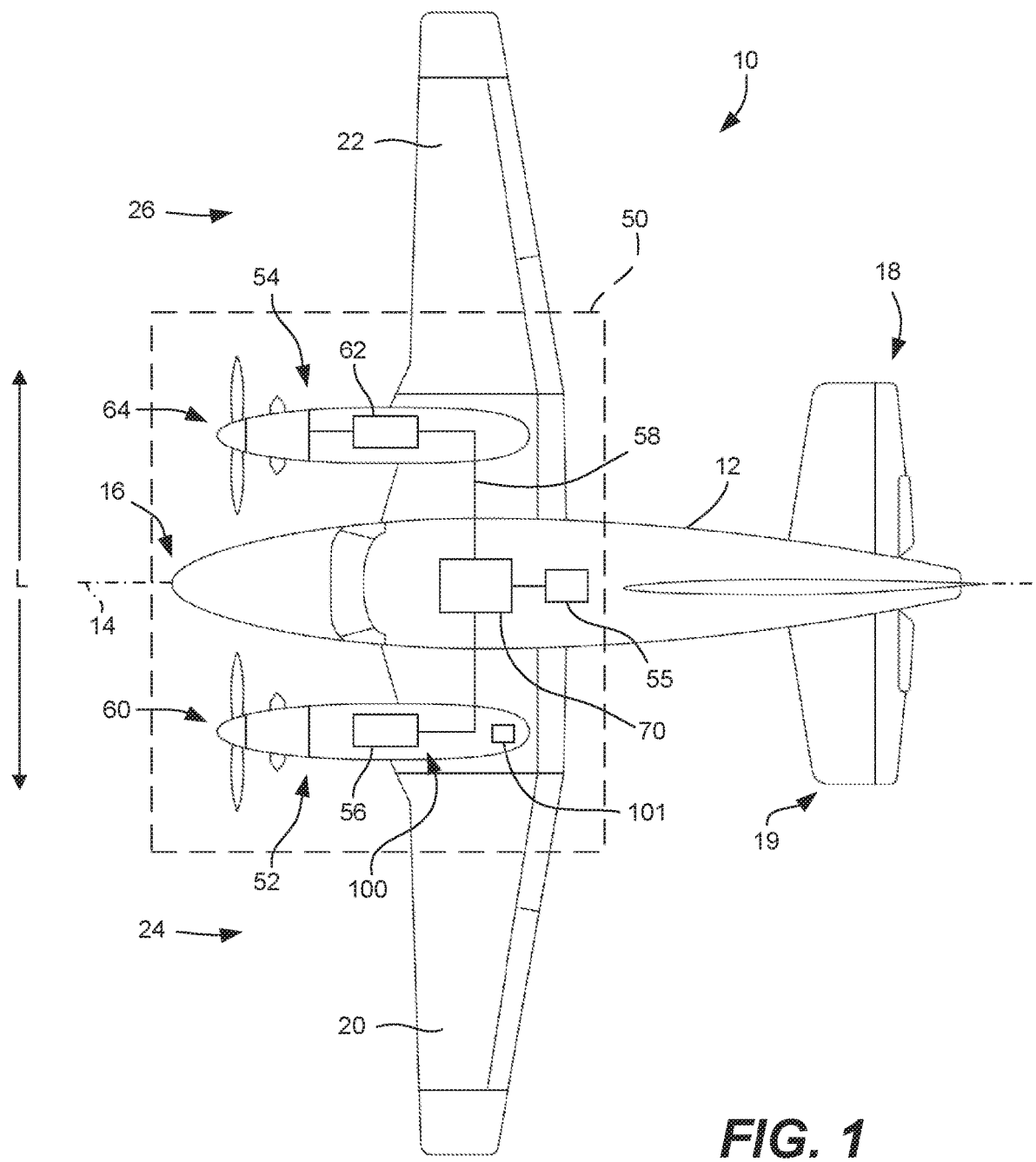
FIG. 1 provides a schematic top view of an exemplary aircraft having a hybrid electric propulsion system in accordance with exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. Furthermore, as used herein, terms of approximation, such as "approximately," "substantially," or "about," refer to being within a ten percent (10%) margin of error. Further, as used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

In general, the present disclosure is directed to a hybrid electric system and methods therefore. For instance, the hybrid electric system may be a hybrid electric propulsion system for an aerial vehicle or a generator assembly for power generation. In one exemplary aspect, a hybrid electric system is provided. The hybrid electric system includes an engine that drives an electric machine operatively coupled thereto. In some instances, the engine is operatively coupled with and drives a propulsor to produce thrust for the vehicle. The electric machine generates electrical power when driven by the engine. One or more electrical loads are electrically connectable with the electric machine and are configured to selectively receive electrical power therefrom. For instance, the electrical loads may include an electric drive configured to drive a propulsor to produce thrust for the vehicle and one or more aircraft system loads, such as e.g., a cabin air conditioning unit. During operation, the engine controller receives load state data indicative of which electrical loads are electrically connected with the electric machine, the power demand of the those loads, and whether any loads are anticipated to become electrically disconnected from or electrically connected to the first electric machine at a predetermined time in the future. In this way, the engine controller may determine whether an electrical load change on the engine is anticipated. Based on whether an electrical load change is anticipated, the engine controller generates a control command. The control command may be representative of instructions for adjusting the fuel flow of the engine. The control command may be sent to a fuel control device configured to selectively control the fuel flow to the engine, and more particularly, to the combustor of the engine. To ensure that the torque output of the engine balances with the torque load on the engine even when the electrical load on the engine changes, the control command includes instructions, that when executed, cause the engine to adjust its torque output in anticipation of the load change on the engine to balance the torques.

In another exemplary aspect, a hybrid electric system is provided. The hybrid electric system may include all of the features noted above except that instead of anticipating electrical load changes and adjusting the torque output of the engine prior to the anticipated electrical load change, the engine controller receives load state indicative of whether at least one electrical load has been electrically connected or disconnected from the electric machine, and consequently, the engine controller can determine whether and to what extent there is a load change on the engine. Notably, the engine controller receives the load state data from feed forward inputs, or components positioned electrically downstream of the electric machine. That is, feed forward inputs are components that are part of the electrical system of the hybrid electric system that are not the electric machine or generator. As load state data is received by the engine controller is indicative of which electrical loads are electrically disconnecting or electrically connecting to the electric machine, upon a load change on the engine, the engine controller generates a control command to control one or more components of the engine to adjust the torque output of the engine. Control commands and action may be taken nearly instantaneously to adjust the torque output as the electrical load change on the engine may be determined from the feed forward inputs. In other exemplary aspects of the present disclosure, a method is provided for operating a hybrid electric system.

FIG. 1 provides a top view of an exemplary aircraft 10 as may incorporate various embodiments of the present disclosure. As shown, the aircraft 10 defines a longitudinal centerline 14 that extends therethrough and a lateral direction L extending orthogonal to the longitudinal centerline 14. The aircraft 10 extends between a forward end 16 and an aft end 18, e.g., along the longitudinal centerline 14. Moreover, the aircraft 10 includes a fuselage 12 extending longitudinally from the forward end 16 of the aircraft 10 to the aft end 18 of the aircraft 10 and an empennage 19 at the aft end 18 of the aircraft 10. Additionally, the aircraft 10 includes a wing assembly including a first, port side wing 20 and a second, starboard side wing 22. The first and second wings 20, 22 each extend laterally outward from the fuselage 12 along the lateral direction L. The first wing 20 and a portion of the fuselage 12 together define a first side 24 of the aircraft 10, and the second wing 22 and another portion of the fuselage 12 together define a second side 26 of the aircraft 10. For this embodiment, the first side 24 of the aircraft 10 is configured as the port side of the aircraft 10 and the second side 26 of the aircraft 10 is configured as the starboard side of the aircraft 10.

Each wing 20, 22 includes various control surfaces, e.g., flaps, ailerons, trim surfaces, etc. for controlling and maneuvering the aircraft 10. The empennage 19 of the aircraft 10 includes a vertical stabilizer having a rudder flap for yaw control and a pair of horizontal stabilizers each having an elevator flap for pitch control. It should be appreciated however, that in other exemplary embodiments of the present disclosure, the aircraft 10 may additionally or alternatively include any other suitable configuration. For example, in other embodiments, the aircraft 10 may include any other configuration of stabilizers.

Further, the exemplary aircraft 10 of FIG. 1 includes a hybrid electric propulsion system 50 having a first propulsion assembly 52 and a second propulsion assembly 54. For the embodiment depicted, the first propulsion assembly 52 and second propulsion assembly 54 are each configured in a wing-mounted configuration. The first propulsion assembly 52 is mounted to the first wing 20 and the second propulsion assembly 54 is mounted to the second wing 22. However, one or both of the first and second propulsion assemblies 52, 54 may be mounted at any other suitable location in other exemplary embodiments.

The first propulsion assembly 52 of the exemplary hybrid electric propulsion system 50 has a torque source configured to generate a torque output and a first propulsor operatively coupled with the torque source. For the depicted embodiment of FIG. 1, the torque source is a turbomachine, and more particularly, the torque source is a gas turbine engine 100 configured as a reverse-flow turboprop. The first propulsor 60 is configured as a first propeller assembly. The exemplary hybrid electric propulsion system 50 also includes a first electric machine 56. The first electric machine 56 is operatively coupled with the gas turbine engine 100 and is configured to generate electrical power when driven by the torque source or gas turbine engine 100. In some embodiments, the electric machine 56 may likewise serve or act as an electric motor.

The second propulsion assembly 54 of the exemplary hybrid electric propulsion system 50 is configured as an electric propulsion assembly and has an electric drive configured to drive a second propulsor operatively coupled with the electric drive. For the depicted embodiment of FIG. 1, the electric drive is a second electric machine 62 and the second propulsor 64 is a second propeller assembly. The second electric machine 62 is selectively electrically connectable to the first electric machine 56 and is configured to receive electrical power from the first electric machine 56. The second electric machine 62 converts the electrical power into a torque output to drive the second propulsor 64 to produce thrust.

The exemplary hybrid electric propulsion system 50 also includes an energy storage unit 55, a power bus 58, and a system controller 70. The second electric machine 62, the energy storage unit 55, and the first electric machine 56 are each electrically connectable to one another through one or more wired or wireless communication lines of the power bus 58. For example, the power bus 58 may include various switches or other power electronics movable to selectively electrically connect the various components of the hybrid electric propulsion system 50. Additionally, the power bus 58 may further include power electronics, such as inverters, converters, rectifiers, etc., for conditioning or converting electrical power within the hybrid electric propulsion system 50, and further for modifying an amount of electrical power provided to, or extracted from, various components within the hybrid electric propulsion system 50.

The system controller 70 is configured to distribute electrical power between the various components of the hybrid electric propulsion system 50. For example, the system controller 70 may be operable with the power bus 58 (including the one or more switches or other power electronics) to provide electrical power to, or draw electrical power from, the various components of the electrical system of the hybrid electric propulsion system 50, such as e.g., the electric machine 56 and electric energy storage unit 55, to operate the hybrid electric propulsion system 50 between various operating modes and perform various functions.

The system controller 70 may be a stand-alone controller dedicated to the hybrid electric propulsion system 50, or alternatively, may be incorporated into one or more of a main system controllers or computing systems of the aircraft 10. Further, the gas turbine engine 100 includes an engine controller 101 for controlling the gas turbine engine 100.

The engine controller 101 may be, for example, an Electronic Engine Controller (EEC) or an Electronic Control Unit (ECU) equipped with Full Authority Digital Engine Control (FADEC). The engine controller 101 includes various components for performing various operations and functions, such as e.g., for controlling the torque output of the gas turbine engine 100. The system controller 70 and the engine controller 101 may be configured in substantially the same manner as the exemplary computing system 500 described below with reference to FIG. 13 (and may be configured to perform one or more of the functions of the exemplary method (300) described below).

Additionally, the electric energy storage unit 55 may be configured as one or more batteries, such as one or more lithium-ion batteries, or alternatively may be configured as any other suitable electrical energy storage devices. It will be appreciated that for the hybrid electric propulsion system 50 described herein, the electric energy storage unit 55 is configured to store a relatively large amount of electrical power. Similarly, it will be appreciated that the electric machine 56 is a relatively large electric machine configured to generate a relatively large amount of electrical power during at least certain operations.

Figure 2:
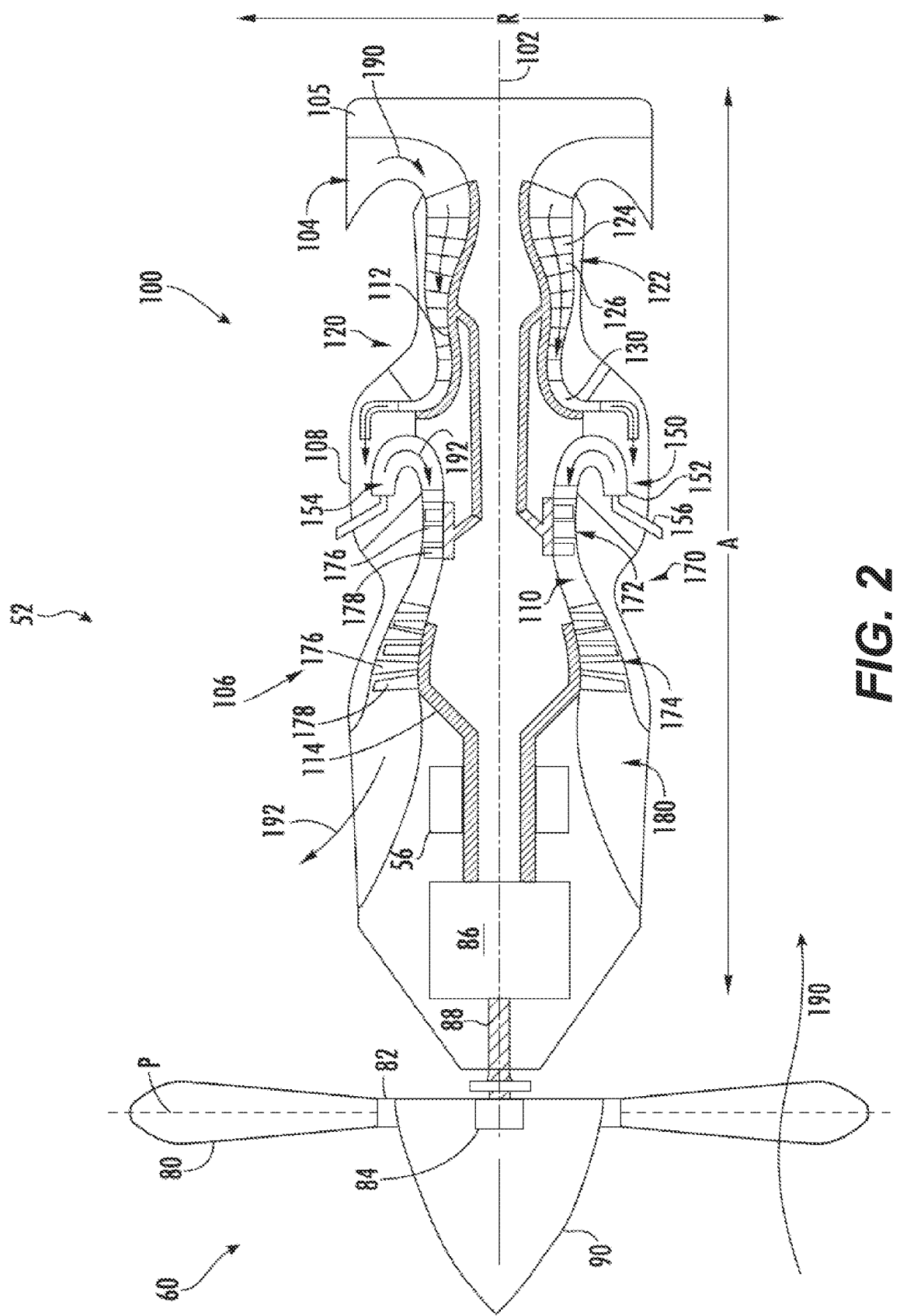
FIG. 2 provides a schematic cross-sectional view of a first propulsion assembly of FIG. 1 depicting an exemplary gas turbine engine operatively coupled with a propeller assembly.

FIG. 2 provides a schematic cross-sectional view of the first propulsion assembly 52 of FIG. 1 depicting the exemplary gas turbine engine 100 and first propulsor 60 as may incorporate various embodiments disclosed herein. For the depicted embodiment of FIG. 2, the gas turbine engine 100 is a reverse-flow engine configured as a turboprop, as previously noted.

As shown, the gas turbine engine 100 defines an axial direction A (extending parallel to a longitudinal centerline 102 provided for reference), a radial direction R, and a circumferential direction (not shown) disposed about the axial direction A. The gas turbine engine 100 includes a core turbine engine 106 disposed downstream of the first propulsor 60. The first propulsor 60 is operable with and driven by the core turbine engine 106.

The exemplary core turbine engine 106 depicted includes a substantially tubular outer casing 108 extending generally along axial direction A. The outer casing 108 generally encloses core turbine engine 106 and may be formed from a single casing or multiple casings. The core turbine engine 106 includes, in a serial flow relationship, a compressor section 120, a combustion section 150, a turbine section 170, and an exhaust section 180. The compressor section 120 includes an axial compressor 122 and a centrifugal impeller 130 positioned downstream of the axial compressor 122. The combustion section 150 includes a plurality of fuel nozzles 156 disposed about the longitudinal centerline 102 and spaced apart along the circumferential direction. The combustion section 150 also includes a combustor 152. The combustor 152 defines a combustion chamber 154. The turbine section 170 includes an HP turbine 172 and an LP turbine 174. For this embodiment, the HP turbine 172 is a gas generation turbine for powering the compressor section 120. The LP turbine 174 is a free or power turbine that rotates about the longitudinal centerline 102 independently of the gas generation turbine, or for this embodiment, the HP turbine 172. The compressor section 120, combustion section 150, turbine section 170, and the exhaust section 180 are in fluid communication with each other and define a core air flowpath 110.

A high pressure (HP) shaft or spool 112, or for this embodiment a gas generation shaft, drivingly connects the HP turbine 172 to the compressor 122. A low pressure (LP) shaft or spool 114, or for this embodiment a power turbine shaft, drivingly connects the LP turbine 174 to the first propulsor 60. For the embodiment depicted, the first propulsor 60 is a variable pitch propeller having a plurality of propeller blades 80 coupled to a disk 82 in a spaced apart manner along the circumferential direction. As depicted, the propeller blades 80 extend outwardly from disk 82 generally along the radial direction R. Each propeller blade 80 is rotatable relative to the disk 82 about a pitch axis P by virtue of the propeller blades 80 being operatively coupled to a suitable actuation member 84 configured to collectively vary the pitch of the propeller blades 80 in unison. The propeller blades 80, disk 82, and actuation member 84 are together rotatable about the longitudinal axis 102 by the LP shaft 114 across a power gearbox 86. The power gearbox 86 includes a plurality of gears for stepping down the rotational speed of the LP shaft 114 to a more efficient rotational speed and is attached to one or both of a core frame or a fan frame through one or more coupling systems. In particular, LP shaft 114 drives a gear train housed within power gearbox 86, which in turn operatively supplies power to the first propulsor 60 via an output shaft 88 at a reduced RPM. Disk 82 is covered by a rotatable spinner or front hub 90 aerodynamically contoured to promote an airflow through the plurality of propeller blades 80. Moreover, notably, the first electric machine 56 is operatively coupled with the LP shaft 114. In this way, during operation of the gas turbine engine 100, the first electric machine 56 generates electrical power.

During operation of the gas turbine engine 100, a volume of air 190 passes through blades 80 of the first propulsor 60 and is urged toward an annular inlet 104 of the core turbine engine 106. More specifically, gas turbine engine 100 includes an inlet body 105 that defines the annular inlet 104 that routes a portion of the flow of air 190 from inlet 104 downstream to the compressor section 120. The compressor section 120 includes the axial compressor 122 that includes one or more sequential stages of compressor stator vanes 124, one or more sequential stages of compressor rotor blades 126, and the impeller 130. The one or more sequential stages of compressor stator vanes 124 are coupled to the outer casing 108 and compressor rotor blades 126 are coupled to HP shaft 112 to progressively compress the flow of air 190. Impeller 130 further compresses air 190 and directs the compressed air 190 into the combustion section 150 where air 190 mixes with fuel. The combustor 152 combusts the air/fuel mixture to provide combustion gases 192.

Combustion gases 192 flow through HP turbine 172, which includes one or more sequential stages of turbine stator vanes 176 and one or more sequential stages of turbine blades 178. The one or more sequential stages of turbine stator vanes 176 are coupled to the outer casing 108 and the turbine blades 178 are coupled to HP shaft 112 to extract thermal and/or kinetic energy from the combustion gases 192. Combustion gases 192 subsequently flow through LP turbine 174, where an additional amount of energy is extracted through additional stages of turbine stator vanes 176 and turbine blades 178 coupled to LP shaft 114. The energy extraction from HP turbine 172 supports operation of the axial compressor 122 and impeller 130 through HP shaft 112 and the energy extraction from LP turbine 174 supports operation of first propulsion assembly 52 through LP shaft 114 as well as first electric machine 56. Combustion gases 192 exit gas turbine engine 100 through the exhaust section 180.

It should be appreciated that the exemplary gas turbine engine 100 depicted in FIG. 2 is by way of example only and that in other exemplary embodiments, gas turbine engine 100 may have any other suitable configuration. For example, it should be appreciated that in other exemplary embodiments, gas turbine engine 100 may instead be configured as any other suitable turbine engine, such as a turbofan engine, turbojet engine, internal combustion engine, etc. Furthermore, although gas turbine engine 100 described above is an aeronautical gas turbine engine for use in a fixed-wing or rotor aircraft, e.g., the aircraft 10 of FIG. 1, in other exemplary embodiments, gas turbine engine 100 may be configured as any suitable type of gas turbine engine that used in any number of applications, such as a land-based, industrial gas turbine engine, or an aeroderivative gas turbine engine. In addition, in other exemplary embodiments, the turbine engine may include any suitable number of compressors, turbines, shafts, etc. For example, as will be appreciated, HP shaft 112 and LP shaft 114 may further be coupled to any suitable device for any suitable purpose. For example, in certain exemplary embodiments, gas turbine engine 100 of FIG. 2 may be utilized to drive a main rotor of a helicopter, may be utilized in aeroderivative applications, etc. Additionally, in other exemplary embodiments, gas turbine engine 100 may include any other suitable type of combustor, and may not include the exemplary reverse flow combustor depicted.

With reference again to FIG. 1, in some instances, the torque load placed on the gas turbine engine 100 by the electrical system of the hybrid electric propulsion system 50 may suddenly and rapidly change, e.g., due to an electrical load being electrically removed from the load. Thus, mismatch between the torque output of the gas turbine engine 100 and the torque load on the gas turbine engine 100 results. Mismatching of the torque output and torque load may cause a number of undesirable consequences. For instance, thrust asymmetry or significant aircraft handling issues may result due to rapid electrical load changes, particularly during rapid electrical load drops or loss of electrical machine torque. For example, if the first electric machine 56 fails or drops offline due to a detected fault or other failure, the second electric machine 62 that relies on the first electric machine 56 for electrical power will cease producing an output torque to drive the second propulsion assembly 128 and the electrical load on the engine 100 will rapidly decrease or drop. Similarly, a sudden loss or failure of the second electric machine 62 will cause the load or counter torque on the first electric machine 56 to rapidly drop to zero (0) and the electrical load on the engine 100 will rapidly decrease or drop. This may cause the first electric machine 56 and/or the gas turbine engine 100 to overspeed. Further, in such instances, the thrust produced by the second propulsion assembly 128 will rapidly drop, and due to the removed electrical load on the first electric machine 56 and ultimately the engine 100, the thrust produced by the first propulsion assembly 116 rapidly increases due to the counter torque on the first electric machine 56 dropping to zero (0) with the torque output of the engine 100 remaining unchanged. Accordingly, the result is thrust asymmetry.

In accordance with exemplary aspects of the present disclosure, the hybrid electric propulsion system 50 includes a control system 200 that includes features that use feed forward inputs from electrical loads that receive electrical power generated by the first electric machine 56 to rapidly and automatically take action in the event of such rapid electrical load changes. Further, in some exemplary aspects of the present disclosure, the control system 200 includes features that use feed forward inputs from electrical loads that receive electrical power generated by the first electric machine 56 to anticipate such rapid electrical load changes and take action accordingly. In this way, the control system 200 of the hybrid electric propulsion system 50 is configured to rapidly and automatically account for electrical load changes either before or on the order of microseconds while the engine 100 spools up or down to match its torque output with the torque load of the electrical system on the engine 100. The engine 100 may take several seconds to spool up or down. Thus, the control system 200 is configured to take rapid and automatic action during this transient period. An exemplary control system is provided below.

Figure 3:
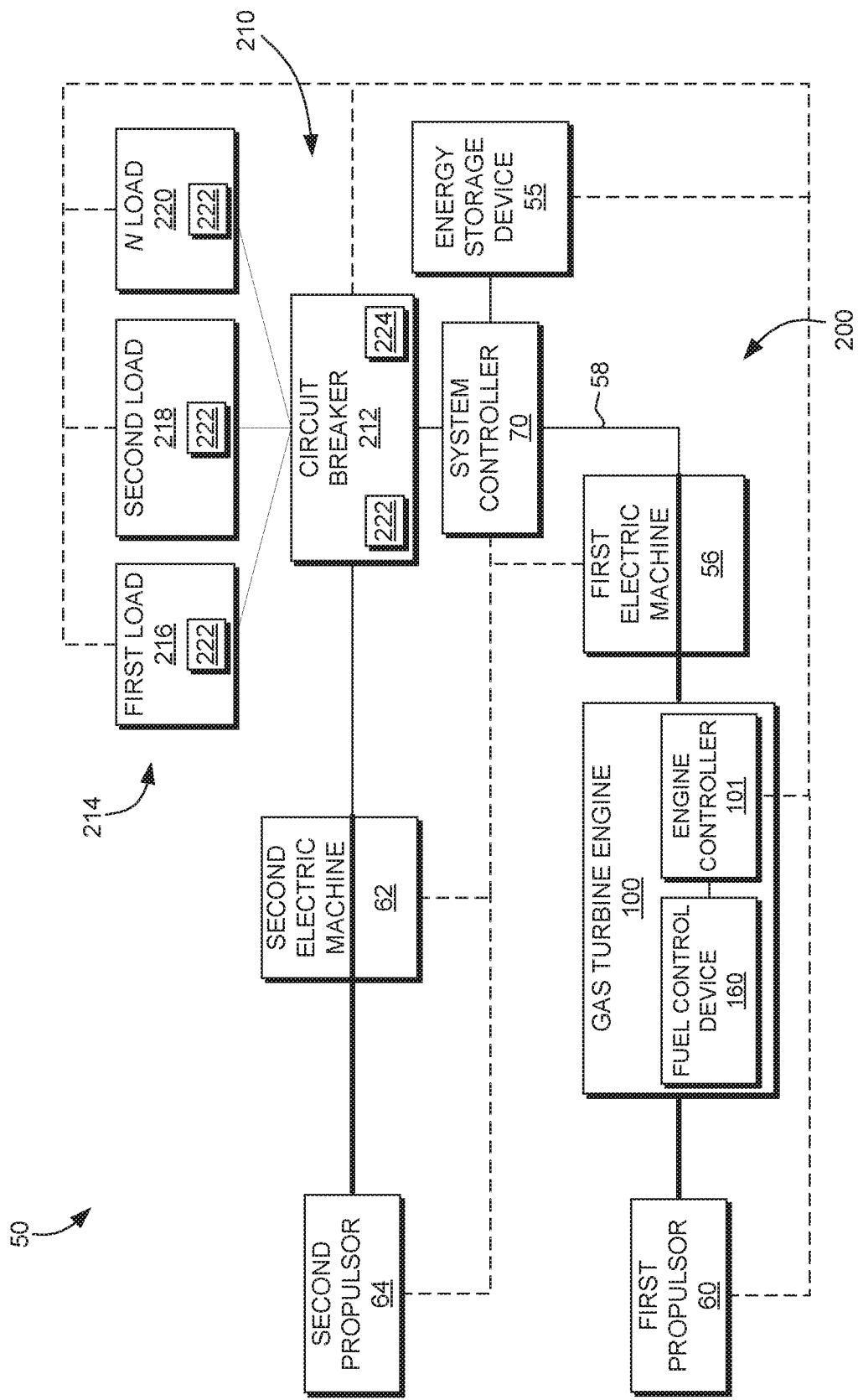
FIG. 3 depicts an exemplary control system in accordance with exemplary embodiments of the present disclosure.

FIG. 3 depicts an exemplary control system 200 for controlling a hybrid electric system in accordance with exemplary embodiments of the present disclosure. For instance, as shown in FIG. 3, the control system 200 may be used to control various aspects of the exemplary hybrid electric propulsion system 50 of the aircraft 10 of FIG. 1.

As depicted, the hybrid electric propulsion system 50 includes a torque source configured to generate a torque output. More particularly, for this embodiment, the torque source is the gas turbine engine 100 of FIGS. 1 and 2. The gas turbine engine 100 includes a fuel control device 160 configured to selectively control a fuel flow to the gas turbine engine 100. For instance, the fuel control device 160 may be positioned along a fuel line between the fuel nozzles 156 (FIG. 2) and a fuel tank. The fuel control device 160 is communicatively coupled with the engine controller 101 as shown in FIG. 3. Based on one or more controls signals from the engine controller 101, the fuel control device 160 may be moved between a closed position and an open position. The fuel control device 160 may be movable between an infinite number of open positions and the closed position, e.g., by use of proportional control valves, or may be switchable between a single open position and a closed position. If the electrical load change or torque load on the gas turbine engine 100 is a load decrease, the one engine controller 101 is configured to activate the fuel control device 160 to reduce or cutoff the fuel flow to the gas turbine engine 100. For instance, the engine controller 101 may activate the fuel control device 160 to move to the closed position based on one or more control signals, e.g., to reduce the fuel flow to the gas turbine engine 100. By reducing the fuel flow to the gas turbine engine 100, the gas turbine engine 100 output torque is decreased, allowing the engine output torque to drop to match the torque load (or the electrical load) on the gas turbine engine 100.

An electric machine is operatively coupled with the torque source. For this embodiment, the electric machine is the first electric machine 56, and consequently, the first electric machine 56 is operatively coupled with the gas turbine engine 100. The first electric machine 56 is configured to generate electrical power when driven by the gas turbine engine 100. In this way, the first electric machine 56 may serve as an electric generator in some instances during operation of the gas turbine engine 100.

As further depicted in FIG. 3, one or more electrical loads 210 are selectively electrically connectable with the first electric machine 56. For this embodiment, a plurality of electrical loads 210 are selectively electrically connectable with the first electric machine 56. The electrical loads 210 are configured to receive electrical power generated by the first electric machine 56 when electrically connected thereto. For the depicted embodiment of FIG. 3, the electrical loads 210 include the second electric machine 62, the system controller 70, the energy storage device 55, a circuit breaker 212, and one or more aircraft system loads 214, including a first load 216, a second load 218, and an N load 220. Any suitable number of aircraft system loads 214 may be electrically connectable to the first electric machine 56, represented by the N load 220. Example aircraft system loads 214 may include an air conditioning unit of the aircraft 10, pumps or fans, displays, data processing units, communication units, other sub-systems, some combination thereof, etc. Notably, the engine controller 101 is communicatively coupled with the electrical loads 210.

In accordance with exemplary aspects of the present disclosure, in some embodiments, the engine controller 101 is configured to receive load state data associated with the one or more electrical loads 210. The engine controller 101 is then configured to determine, based on the load state data, whether a load change on the gas turbine engine 100 is anticipated. The engine controller 101 is then configured to generate a control command based at least in part on whether the load change on the gas turbine engine 100 is anticipated. In some embodiments, the control command is representative of instructions for changing the torque output of the gas turbine engine 100, e.g., instructions for reducing the fuel flow to the gas turbine engine 100. Moreover, in some embodiments, after the engine controller 101 generates the control command, the engine controller 101 communicates the control command to the gas turbine engine 100, and more particularly, the control command is communicated to the fuel control device 160 such that the fuel flow to the gas turbine engine 100 may be adjusted to balance the torque output of the gas turbine engine 100 and the torque load placed on the gas turbine engine 100 by the electrical system of the hybrid electric system 50.

For instance, during operation, the engine controller 101 receives load state data associated with the one or more electrical loads 210. The load state data may be routed to the engine controller 101 from the electrical loads 210, from sensing devices 222 configured to sense the load state data of their associated electrical loads 210 as shown in FIG. 3, the system controller 70, other systems of the aircraft 10 (FIG. 1), a combination thereof, etc. The engine controller 101 may receive load state data associated with the one or more electrical loads 210 at predetermined intervals, such as e.g., a time step on the order of microseconds.

Figure 4:
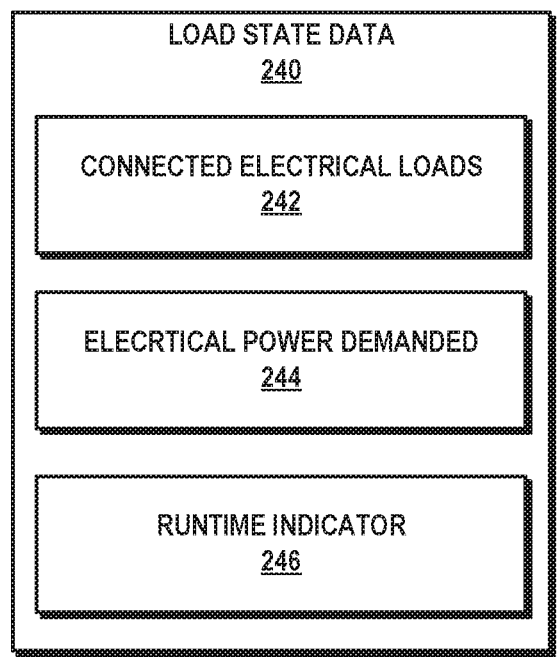
FIG. 4 provides a block diagram of exemplary load state data in accordance with exemplary embodiments of the present disclosure.

FIG. 4 provides a block diagram of exemplary load state data 240. As shown, for this embodiment, the load state data 240 is indicative of the connected electrical loads 242, or stated differently, the electrical loads 210 that are electrically connected with the first electric machine 56. Further, the load state data 240 is indicative of the electrical power demanded 244 by the electrical loads 210 electrically connected to the first electric machine 56 (FIG. 3). Moreover, for this embodiment, the load state data 240 further includes a runtime indicator 246 indicative of a time period in which one or more of the electrical loads 210 anticipate or are scheduled to drop offline. Stated differently, the runtime indicator 246 is indicative of a time period in which one or more electrical loads 210 anticipate or are scheduled to be electrically disconnected from the first electric machine 56. Moreover, in some embodiments, the load state data 240 is indicative of one or more electrical loads 210 that anticipate or are scheduled to come online, (i.e., one or more electrical loads 210 anticipate or are scheduled to become electrically connected with and receive electrical power from the first electric machine 56 at a predetermined time). The runtime indicator 246 may indicate the predetermined time at which the one or more electrical loads 210 anticipate or are scheduled to come online. Accordingly, when the electrical load change is a load increase on the gas turbine engine 100, the torque output of the gas turbine engine 100 may match or nearly match the increased torque load placed on the gas turbine engine 100 by the electrical system.

By way of example, with reference to FIGS. 3 and 4, suppose that the first load 216 is an air conditioning unit for the cabin of the aircraft 10 (FIG. 1) and that the first load 216 is electrically connected with the first electric machine 56. The load state data 240 may indicate that the first load 216 is online (i.e., the first load 216 is electrically connected with and receiving electrical power from the first electric machine 56) via the connected electrical loads 242 portion of the load state data 240. The load state data 240 may also indicate the power demanded by the first load 216 via the electrical power demanded 244 portion of the load state data 240. Further, the runtime indicator 246 of the load state data 240 may indicate how long the first load 216 has been operating and whether the first load is anticipated or scheduled to drop offline, and if so, when the first load 216 anticipates dropping offline. For instance, suppose the runtime indicator 246 indicates that the first load 216 anticipates dropping offline in approximately ten (10) seconds, e.g., based on the cooling rate of the cabin and that the sensed cabin temperature is nearing the set temperature. In addition, the load state data 240 may also indicate like information about the second load 218 and all other electrical loads electrically connected with the first electric machine 56.

After the engine controller 101 receives the load state data 240 associated with the one or more electrical loads 210, the engine controller 101 determines, based on the load state data 240, whether a load change on the gas turbine engine 100 is anticipated. Continuing with the example above, the runtime indicator 246 of the first load 216 indicated that the first load 216 anticipates going offline in approximately ten (10) seconds. Based on the load state data 240 and particularly the runtime indicator 246, the engine controller 101 determines that a load change on the gas turbine engine 100 is imminent, and consequently, that an electrical load change is anticipated. In particular, the engine controller 101 determines that a significant speed excursion of the gas turbine engine 100 and/or the first electric machine 56 may result in about ten (10) seconds due to the size of the load that the first load 216 places on the gas turbine engine 100. As such, action may be taken as explained below.

The engine controller 101 then generates a control command based at least in part on whether the load change on the gas turbine engine 100 is anticipated. For instance, if the engine controller 101 determines that a load change on the gas turbine engine 100 is anticipated, the engine controller 101 generates a control command. If the engine controller 101 determines that a load change on the gas turbine engine 100 is not anticipated, then a control command can be generated to command the gas turbine engine 100 to resume current operation. Alternatively, no control command may be generated in some instances.

In some embodiments, particularly when an electrical load change on the gas turbine engine 100 is anticipated, the control command is representative of instructions for changing the torque output of the gas turbine engine 100. Continuing with the example above, recognizing that the runtime indicator 246 of the first load 216 indicated that the first load 216 anticipates going offline in approximately ten (10) seconds and that the first load 216 going offline will cause an electrical load change on the gas turbine engine 100, the control command may include instructions for changing the torque output of the gas turbine engine 100 in such a way that the torque output of the gas turbine engine 100 matches or nearly matches the torque load on the gas turbine engine 100 despite the electrical load change. If the electrical load change is anticipated as a load decrease on the gas turbine engine 100 (i.e., one of the electrical loads 210 currently electrically connected with the first electric machine 56 is anticipated or scheduled to drop offline), then the instructions may include instructions for reducing the torque output of the gas turbine engine 100. On the other hand, if the electrical load change is anticipated as a load increase on the gas turbine engine 100 (i.e., another electrical load 210 is anticipated to come online), then the instructions may include instructions for reducing the torque output of the gas turbine engine 100.

As one example, if the electrical load change is anticipated as a load decrease on the gas turbine engine 100, the control command may be communicated to the fuel control device 160 such that the fuel flow to the gas turbine engine 100 is reduced a predetermined time prior to the first load 216 going offline. In this way, the gas turbine engine 100 may "spool down" or reduce its speed to reduce its torque output to match the reduced torque load caused by the first load 216 going offline. Thus, the control command communicated to the gas turbine engine 100 includes instructions for controlling the fuel control device 160 to selectively control the fuel flow to the gas turbine engine 100. If the load change anticipated on the gas turbine engine 100 is a load decrease, the control command communicated to the gas turbine engine 100 includes instructions for controlling the fuel control device 160 to reduce the fuel flow to the gas turbine engine 100. For instance, the control command may include instructions to the fuel control device 160 to reduce fuel flow about two (2) seconds prior to the anticipated load change on the gas turbine engine 100. If the load change anticipated on the gas turbine engine 100 is a load increase, the control command communicated to the gas turbine engine 100 includes instructions for controlling the fuel control device 160 to increase the fuel flow to the gas turbine engine 100.

Figure 5:
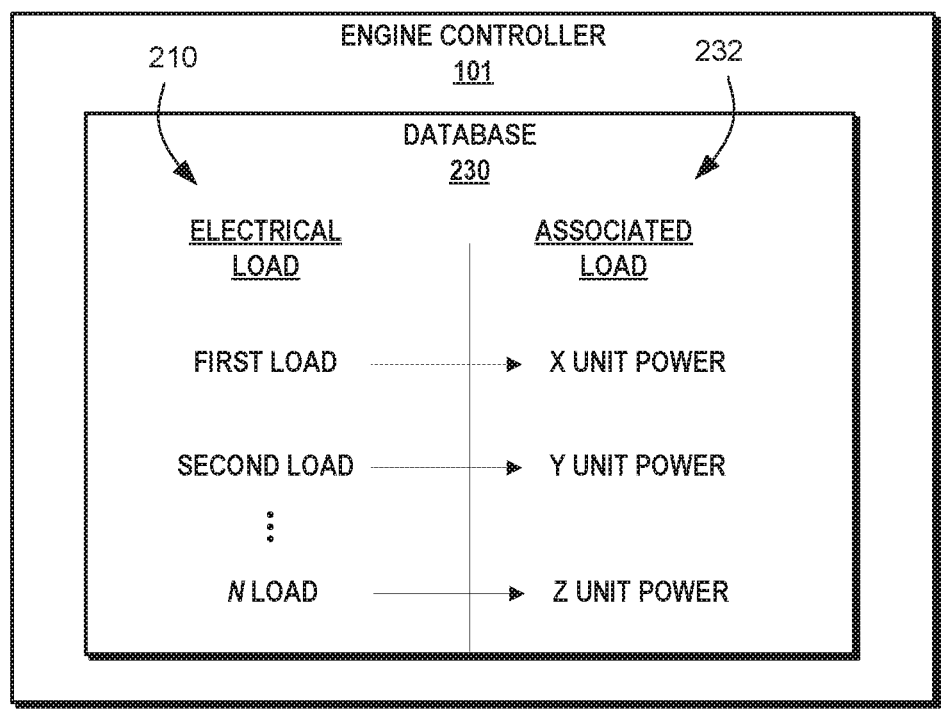
FIG. 5 provides an example database of the engine controller of FIG. 3.

FIG. 5 provides an example database 230 of the engine controller 101 of FIG. 3. As shown, the database 230 associates each electrical load 210 with an associated load 232. The associated load 232 of a particular electrical load 210 is indicative of the electrical power operating range of the particular electrical load 210, e.g., under normal conditions. For this example, the first load 216 has an associated load of X unit power, the second load 218 has an associated load of Y unit power, and the N load 220 has an associated load of Z unit power. Continuing with the example, above, in some embodiments, to balance the torque output of the gas turbine engine 100 as near as possible to the torque load on the gas turbine engine 100 when the first load 216 is taken offline in approximately (10) seconds, the engine controller 101 predicts the load change on the gas turbine engine 100. More particularly, the engine controller 101 accesses the database 230 that associates each electrical load 210 that is electrically connectable with the first electric machine 56 with an associated load 232. Once accessed, the engine controller 101 ascertains the associated load associated with the electrical load 210 that is anticipated to drop offline. Continuing with the example above, as the first load 216 is anticipated to go offline, the engine controller 101 ascertains the load associated with the first load 216, which in this example is X unit power.

Based on the ascertained load associated with the first load 216, the engine controller 101 can predict the electrical load change on the gas turbine engine 100. By predicting the electrical load change on the gas turbine engine 100, the accuracy of the instructions of the control command for changing the torque output of the gas turbine engine 100 may be improved such that the torque output and torque load on the gas turbine engine 100 may be better balanced upon the electrical load change. For instance, the engine controller 101 may determine the fuel flow reduction to achieve the torque output of the gas turbine engine 100 that will match or nearly match the torque load on the gas turbine engine 100 upon the occurrence of the anticipated electrical load change, e.g., when the first load 216 drops offline.

In addition, in some embodiments, if one or more loads are anticipated to come online at a predetermined time in the future, as determined by the runtime indicator 246 of the load state data 240, the engine controller 101 may ascertain the load or loads associated with the one or more electrical loads that are anticipated to come online, e.g., by accessing the database 230 and ascertaining the load or loads associated with the electrical loads coming online. In this way, the torque output of the gas turbine engine 100 may more accurately be increased to reflect the increased torque load on the gas turbine engine 100 due to the additional electrical load or loads coming online.

With reference again to FIG. 3, in some embodiments, the engine controller 101 is configured to receive a performance parameter indicative of the torque output of the gas turbine engine 100. For instance, the performance parameter may be the speed of a rotating component of the gas turbine engine 100, e.g., a stage of compressor blades. The performance parameter may be utilized to determine the torque output of the gas turbine engine 100. Thus, the performance parameter provides the engine controller 101 with information as to the torque output of the gas turbine engine 100 prior to the anticipated electrical load change on the gas turbine engine 100. In this way, particularly when the gas turbine engine 100 is operating at a low operating speed, it may be ensured that the torque output of the gas turbine engine 100 does not drop below or exceed a torque output required to drive the first and second propulsors 60, 64 (FIGS. 1 and 3) for safe flight. Accordingly, in such embodiments, the control command is generated by the engine controller 101 based at least in part on the performance parameter.

Moreover, in some embodiments, once the anticipated electrical load change actually occurs, the engine controller 101 is configured to receive a performance parameter indicative of the torque load on the gas turbine engine 100. For instance, the performance parameter may be the electric current generated by the first electric machine 56, the output voltage of the first electric machine 56, the speed of a rotating component of the electric machine 56, some combination thereof, etc. The performance parameter indicative of the torque load on the gas turbine engine 100 may be utilized to determine whether the torque output of the gas turbine engine 100 matches or balances with the torque load placed on the gas turbine engine 100 by the electrical system of the hybrid electric system 50. If the torques are not balanced, then another control command may be generated and communicated to the fuel control device 160 to adjust the fuel flow to the gas turbine engine 100, e.g., to adjust the torque output of the gas turbine engine 100.

In accordance with another exemplary aspect of the present disclosure, in some embodiments, the engine controller 101 is configured to receive load state data associated with the one or more electrical loads 210. The engine controller 101 is then configured to determine, based on the load state data, whether a load change on the gas turbine engine 100 is present. The engine controller 101 is then configured to generate a control command based at least in part on whether the load change on the gas turbine engine 100 is present. Thus, in such exemplary embodiments, action is taken based on feed forward inputs once the electrical load change occurs as will be explained further below.

As noted above, during operation, the engine controller 101 receives load state data associated with the one or more electrical loads 210. The load state data may be routed from feed forward inputs to the engine controller 101. For instance, feed forward inputs may include the electrical loads 210, the sensing devices 222 configured to sense the load state data of their associated electrical loads 210 as shown in FIG. 3, the system controller 70, the circuit breaker 212, or other systems of the aircraft 10 (FIG. 1) positioned electrically downstream of the first electric machine 56. The engine controller 101 may receive load state data associated with the one or more electrical loads 210 at predetermined intervals, such as e.g., a time step on the order of microseconds.

Figure 6:
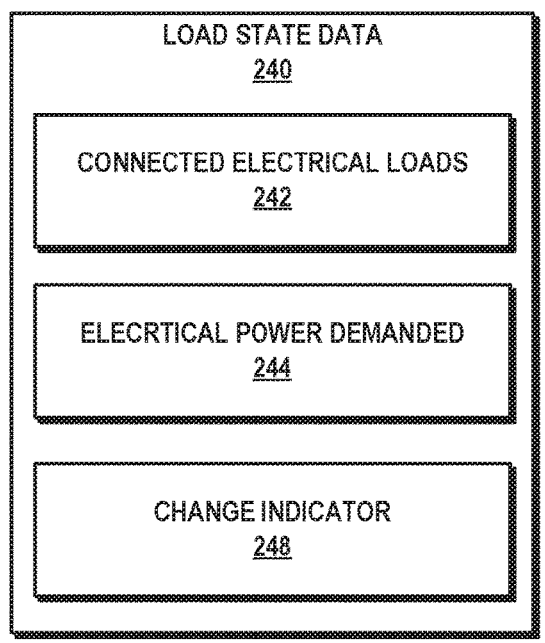
FIG. 6 provides a block diagram of exemplary load state data in accordance with exemplary embodiments of the present disclosure.

FIG. 6 provides a block diagram of exemplary load state data 240. As shown, for this embodiment, the load state data 240 is indicative of the connected electrical loads 242, or stated differently, the electrical loads 210 that are electrically connected with the first electric machine 56. Further, the load state data 240 is indicative of the electrical power demanded 244 by the electrical loads 210 electrically connected to the first electric machine 56 (FIG. 3). Moreover, for this embodiment, the load state data 240 includes a change indicator 248 indicative of one or more electrical loads 210 that have dropped offline or come online within a predetermined time interval, such as e.g., a time step on the order of microseconds. In some instances, the change indicator 248 may indicate electrical loads 210 that have dropped offline and electrical loads 210 that have come online.

By way of example, with reference to FIGS. 3 and 6, suppose that the second load 218 is a cabin lighting unit for the aircraft 10 (FIG. 1) and that the cabin lighting unit is electrically connected with and receiving electrical power from the first electric machine 56. At a first time step, the load state data 240 may indicate that the second load 218 is online (i.e., that the second load 218 is electrically connected with and receiving electrical power from the first electric machine 56) via the connected electrical loads 242 portion of the load state data 240. The load state data 240 may also indicate the power demanded by the second load 218 via the electrical power demanded 244 portion of the load state data 240. Further, the change indicator 248 of the load state data 240 may indicate that none of the electrical loads 210 electrically connected with the first electric machine 56 have dropped offline or come online during a predetermined interval. At a second time step, however, the connected electrical loads 242 portion of the load state data 240 may indicate the electrical loads 210 that are online and the electrical power demanded 244 portion of the load state data 240 may indicate the power demanded by the electrical loads 210 electrically connected with the first electric machine 56. Further, the change indicator 248 of the load state data 240 may indicate that the second load 218 has dropped offline within the predetermined interval. The change indicator 248 of the load state data 240 may also indicate other electrical loads 210 that have dropped offline or come online.

After the engine controller 101 receives the load state data 240 associated with the one or more electrical loads 210, the engine controller 101 determines, based on the load state data 240, whether a load change on the gas turbine engine 100 is present. Continuing with the example above, suppose the change indicator 248 indicated that only the second load 218 dropped offline during the predetermined interval. Thus, based on the load state data 240 and particularly the change indicator 248, the engine controller 101 determines that a load change on the gas turbine engine 100 is present. Consequently, the torque load on the gas turbine engine 100 decreases. However, action may be taken as explained below.

The engine controller 101 then generates a control command based at least in part on whether the load change on the gas turbine engine 100 is present. For instance, if the engine controller 101 determines that a load change on the gas turbine engine 100 is present, the engine controller 101 generates a control command. If the engine controller 101 determines that a load change on the gas turbine engine 100 is not present, then a control command can be generated to command the gas turbine engine 100 to resume current operation. Alternatively, no control command may be generated in some instances.

In some embodiments, particularly when an electrical load change on the gas turbine engine 100 is present, the control command is representative of instructions for changing the torque output of the gas turbine engine 100. Continuing with the example above, recognizing that the change indicator 248 of the load state data indicated that the second load 218 has dropped offline within the predetermined interval, the control command generated by the engine controller 101 may include instructions for changing the torque output of the gas turbine engine 100 in such a way that the torque output of the gas turbine engine 100 matches or nearly matches the torque load on the gas turbine engine 100 despite the electrical load change. More particularly, as the present electrical load change is a load decrease on the gas turbine engine 100, the control command includes instructions for reducing the torque output of the gas turbine engine 100. If the present electrical load change is a load increase on the gas turbine engine 100, then the control command may include instructions for reducing the torque output of the gas turbine engine 100.

As one example, if the present electrical load change is a load decrease on the gas turbine engine 100, the control command may be communicated to the fuel control device 160 such that the fuel flow to the gas turbine engine 100 is reduced or decreased. In this way, the gas turbine engine 100 may "spool down" or reduce its speed to reduce its torque output to match the reduced torque load caused by the second load 218 going offline. Thus, the control command communicated to the gas turbine engine 100 includes instructions for controlling the fuel control device 160 to selectively control the fuel flow to the gas turbine engine 100. If the present electrical load change on the gas turbine engine 100 is a load increase, the control command communicated to the gas turbine engine 100 includes instructions for controlling the fuel control device 160 to increase the fuel flow to the gas turbine engine 100.

Figure 7:
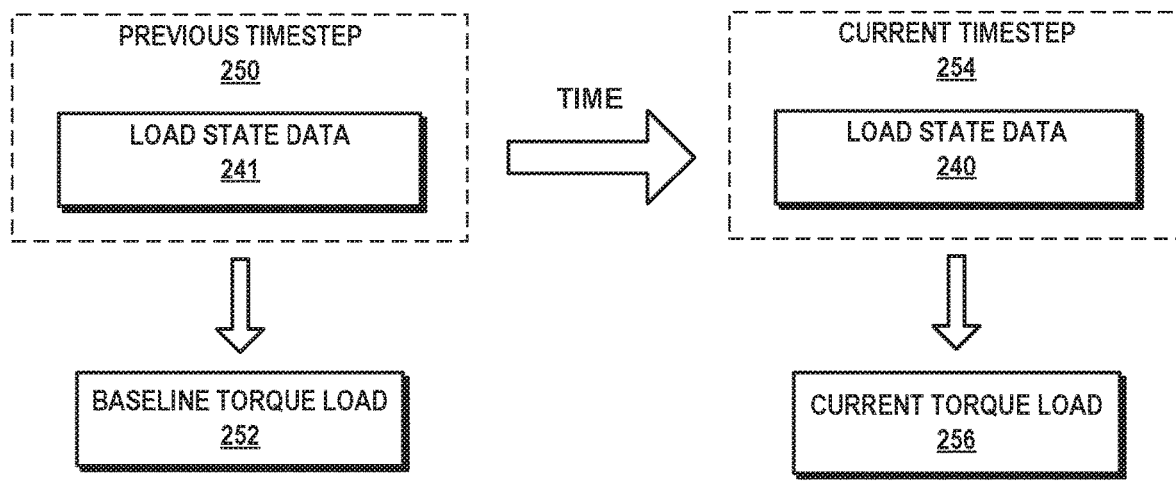
FIG. 7 provides a block diagram of an exemplary manner in which the engine controller may calculate an electrical load change on the engine in accordance with exemplary embodiments of the present disclosure.

In some embodiments, with reference to FIGS. 3, 6, and 7, to better control the fuel flow to the gas turbine engine 100 to either increase or decrease the torque output of the gas turbine engine 100 to match the torque load on the gas turbine engine 100 due to the electrical load change, the engine controller 101 may calculate the electrical load change on the gas turbine engine 100. FIG. 7 provides an exemplary manner in which the engine controller 101 may calculate the electrical load change. For each predetermined interval or time step, the engine controller 101 may calculate the total electrical load or torque load on the gas turbine engine 100, e.g., by adding together the power demanded of each electrical load 210 electrically connected to the first electric machine 56 and the load placed on the gas turbine engine 100 by the first electric machine 56 itself. To calculate the electrical load change or torque load delta on the gas turbine engine 100, the engine controller 101 calculates, based on load state data 241 from a previous time step 250, a baseline toque load 252 on the gas turbine engine 100. Upon occurrence of the next time step, the engine controller 101 calculates, based on the load state data 240 from a current time step 254, a current torque load 256 on the gas turbine engine 100. Thereafter, the engine controller 101 determines the electrical load change on the gas turbine engine 100 based at least in part on the baseline torque load 252 and the current torque load 256 on the gas turbine engine 100. For instance, the baseline torque load 252 may be subtracted from the current torque load 256 to determine the electrical load change on the gas turbine engine 100. If the difference is negative, then the electrical load change is a load decrease or reduced torque load on the gas turbine engine 100, and in contrast, if the difference is positive, then the electrical load change is a load increase or increased torque load on the gas turbine engine 100. Based on the determined electrical load change, the engine controller 101 may generate a control command with more accurate instructions for adjusting the fuel flow to the gas turbine engine 100.

Notably, as the engine controller 101 receives load state data 240 from electrical components or loads electrically downstream of the first electric machine 56, the engine controller 101 may nearly instantaneously (i.e., within milliseconds or microseconds) begin adjusting the fuel flow such that the torque output of the gas turbine engine 100 more closely matches the torque load placed on the gas turbine engine 100 by the electrical system of the hybrid electric system 50.

For instance, suppose a pilot switches off the cabin air conditioning unit electrically connected to the first electric machine 56. Instead of reacting to parameters taken or measured at the first electric machine 56 and the gas turbine engine 100 to match the torques, feed forward inputs positioned electrically downstream of the first electric machine 56 are utilized to react to the electrical load change more quickly. In particular, load state data 240 can be sent from the switch electronics, from the circuit breaker 212, from sensing devices 222, etc. immediately to the engine controller 101 of the gas turbine engine 100 so that the engine controller 101 may take further action to reduce the fuel flow to the engine.

Importantly, the ability to react to electrical load changes quickly (e.g. on the order of milliseconds or microseconds) has numerous benefits. For instance, the fuel to the gas turbine engine may be adjusted within milliseconds of the electrical load change as opposed to, e.g., seconds with conventional reactionary systems. Thus, speed excursions of the gas turbine engine and the first electric machine 56 may be reduced. This may improve the life of the gas turbine engine 100 and the first electric machine 56 or generator. Further, this may better maintain power output quality (e.g., for isochronous power generation applications), thrust stability, overvoltage, and/or overspeed margin. Moreover, lower-inertia electric generators may be employed at reduced weight/cost as the magnitude of speed excursions are reduced. In addition, a reduced risk of compressor surge may be achieved due to a reduction in operating line mismatch.

Figure 8:
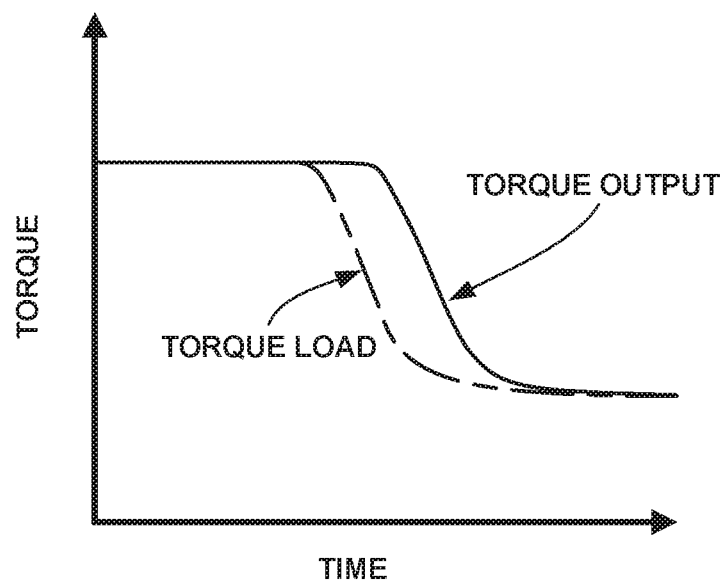
FIG. 8 graphically depicts both the torque load on the engine and the torque output of the engine as a function of time upon the occurrence of an electrical load change on the engine with use of a conventional prior art control system to balance the torques.
Figure 9:
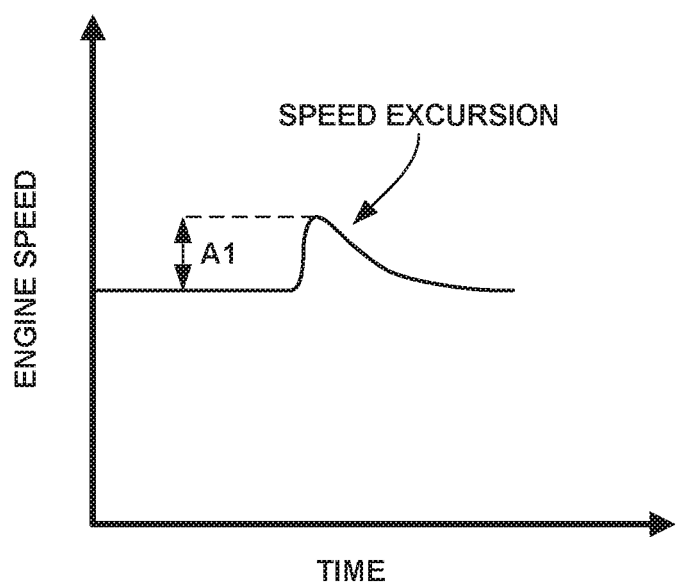
FIG. 9 graphically depicts the engine speed of the engine during the electrical load change of FIG. 8 as a function of time with use of the conventional prior art control system to balance the torques.

FIG. 8 graphically depicts both the torque load on the engine and the torque output of the engine as a function of time upon the occurrence of an electrical load change on the engine with use of a conventional prior art control system to balance the torques and FIG. 9 graphically depicts the engine speed of the engine during the electrical load change as a function of time with use of the conventional prior art control system to balance the torques. As shown in FIG. 8, before the electrical load change, which in this instance is a load drop on the engine, the torque load on the engine and the torque output of the engine are balanced. However, upon the occurrence of the electrical load drop, the torque load rapidly decreases and the torque output of the engine continues steady for a transient period in which fuel flow remains the same despite the reduced torque load on the engine. Eventually, parameters sensed at the engine and the electrical generator of the system indicate that there is a torque imbalance, and accordingly, the fuel is reduced to the engine. Consequently, the torque output decreases to eventually balances out with the torque load. As shown in FIG. 9, during the electrical load drop, the speed of the engine rapidly increases when the electrical load drops offline. The engine experiences a speed excursion having an amplitude A1. As the torques become balanced after the transient period, the engine speed settles.

Figure 10:
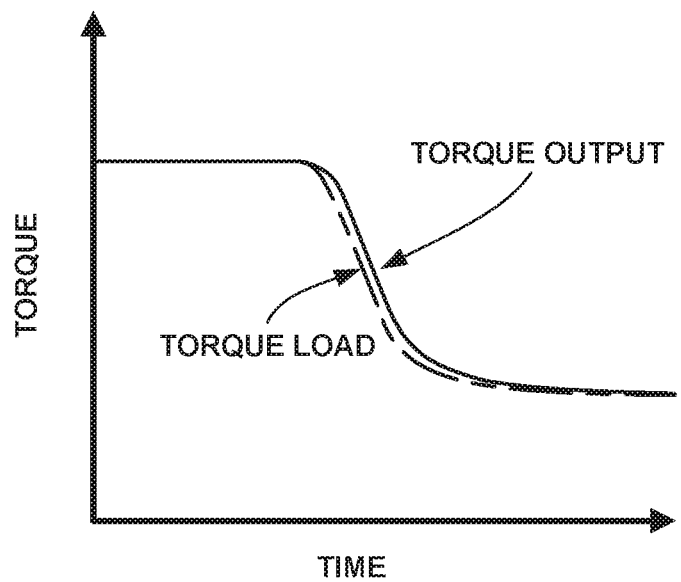
FIG. 10 graphically depicts both the torque load on the engine and the torque output of the engine as a function of time upon the occurrence of an electrical load change on the engine with use of a control system of the present disclosure to balance the torques.
Figure 11:
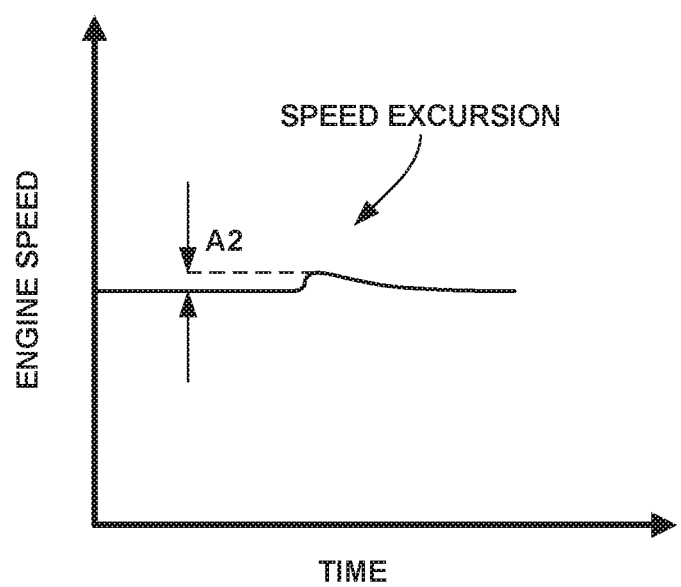
FIG. 11 graphically depicts the engine speed of the engine during the electrical load change of FIG. 10 as a function of time with use of the of the present disclosure to balance the torques.

FIG. 10 graphically depicts both the torque load on the engine and the torque output of the engine as a function of time upon the occurrence of an electrical load change on the engine with use of a control system of the present disclosure to balance the torques and FIG. 11 graphically depicts the engine speed of the engine during the electrical load change as a function of time with use of the of the present disclosure to balance the torques. As shown in FIG. 10, before the electrical load change, which in this instance is a load drop on the engine, the torque load on the engine and the torque output of the engine are balanced. Upon the occurrence of the electrical load drop, the torque load rapidly decreases, and notably, the torque output of the engine also rapidly decrease to balance with or match as closely as possible with the torque load. By comparing the graph of FIG. 8 and the graph of FIG. 10, as depicted, the torque output of the engine more closely balances with the torque load on the engine in FIG. 10 than the torque output balances with the torque load in FIG. 8. With use of feed forward inputs and/or anticipating electrical load drops, the torques may be better balanced upon the occurrence of electrical load changes. As shown in FIG. 11, during the electrical load drop, the speed of the engine increases only slightly when the electrical load drops offline. The engine experiences a speed excursion having an amplitude A2. By comparing the graph of FIG. 9 and the graph of FIG. 11, as depicted, the amplitude A2 of the speed excursion of the engine depicted in the graph of FIG. 9 is greater than the amplitude A1 depicted in FIG. 11. Thus, as illustrated, exemplary control systems of the present disclosure may limit speed excursions of the gas turbine engine 100 during electrical load changes, and although not shown, exemplary control systems of the present disclosure may limit speed excursions of the first electric machine 56 during electrical load changes.

Figure 12:
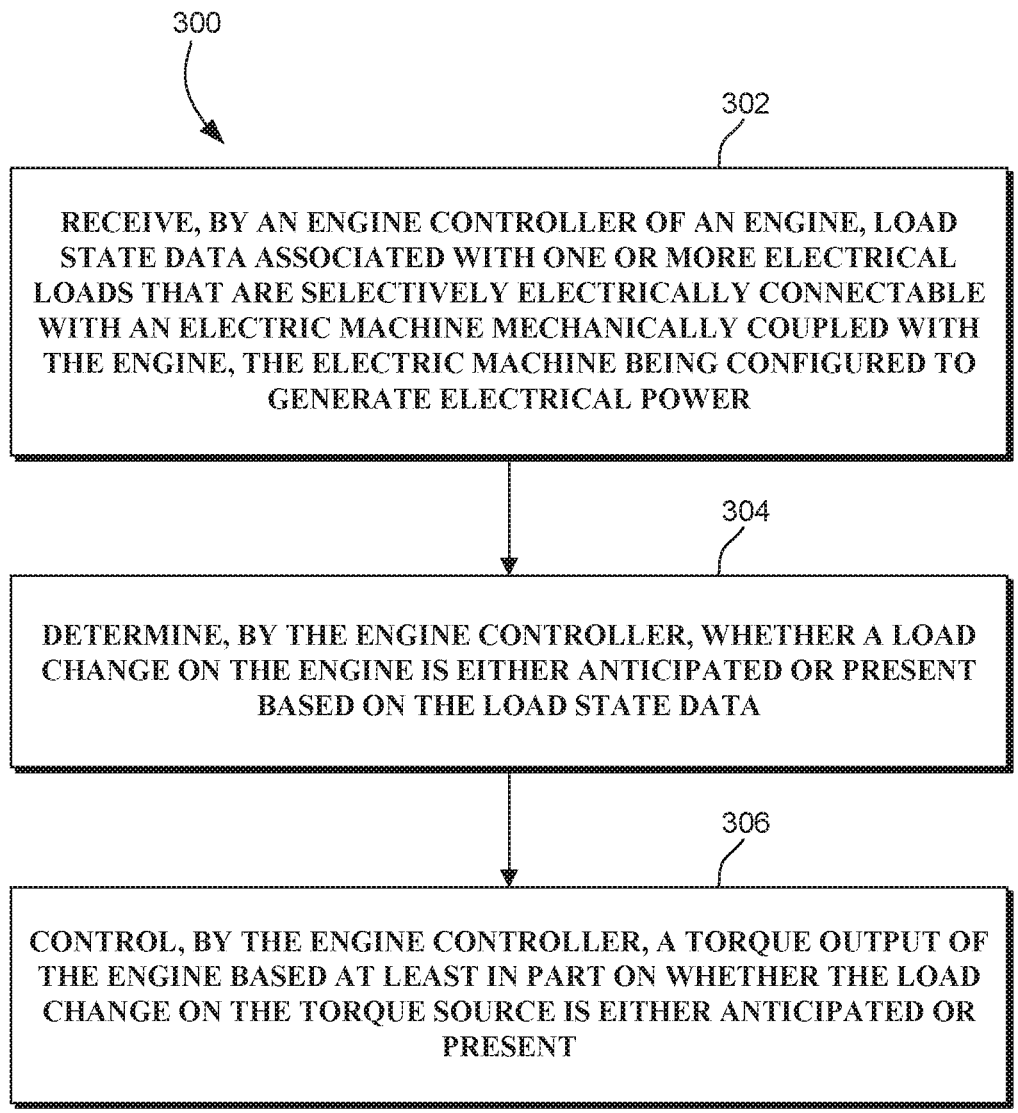
FIG. 12 provides a flow diagram of an exemplary method in accordance with exemplary aspects of the present disclosure.

FIG. 12 provides a flow diagram of an exemplary method (300) for operating a hybrid electric propulsion system for an aerial vehicle. For instance, the hybrid electric propulsion system and the aerial vehicle may be the hybrid electric propulsion system 50 and the aerial vehicle may be the aircraft 10 of FIGS. 1 and 2.

At (302), the method (300) includes receiving, by an engine controller of an engine, load state data associated with one or more electrical loads that are selectively electrically connectable with an electric machine operatively coupled with the engine, the electric machine being configured to generate electrical power when driven by the engine.

At (304), the method (300) includes determining, by the engine controller, whether a load change on the engine is either anticipated or present based at least in part on the load state data.

At (306), the method (300) includes controlling, by the engine controller, a torque output of the engine based at least in part on whether the load change on the engine is either anticipated or present.

In some implementations, controlling, by the engine controller, the torque output of the engine based at least in part on whether the load change on the engine is either anticipated or present comprises adjusting a fuel flow to the engine. In some implementations, the fuel flow to the engine is adjusted prior to the load change on the engine. For instance, if a load decrease on the engine is anticipated, the fuel flow is reduced prior to the load decrease on the engine. If, on the other hand, a load increase on the engine is anticipated, the fuel flow is increased or the fuel control device is moved to a more open position prior to the load increase on the engine.

In some implementations, the one or more electrical loads 210 include circuit breaker 212 electrically coupled with at least one other electrical load of the one or more electrical loads 210. In such implementations, as shown in FIG. 3, the circuit breaker 212 includes at least one breaker switch 224 associated with the at least one other electrical load of the one or more electrical loads 210. In such implementations, the load state data 240 (FIG. 4) associated with the one other of the one or more electrical loads 210 is sensed at the at least one breaker switch 224. By sensing the load state data 240 of the other electrical load at the circuit breaker 212, e.g., at the breaker switch 224, a central location for sensing which electrical loads are electrically connected to the first electric machine 56 is provided.

In some implementations, the hybrid electric system is a hybrid electric propulsion system for an aircraft, e.g. as shown in FIG. 1. In such implementations, with reference again to FIG. 3, the one or more electrical loads 210 include circuit breaker 212 and an aircraft system load 214 electrically connectable with the circuit breaker 212. In such implementations, the load state data 240 (FIG. 4) of the aircraft system load 214 is sensed at the circuit breaker 212. In some further implementations, a plurality of aircraft system loads 214 are electrically connectable with the circuit breaker 212. In such implementations, the load state data of the plurality of aircraft system loads 214 are sensed at the circuit breaker 212. As noted above, by sensing the load state data 240 of the aircraft system loads 214 at the circuit breaker 212, e.g., at the breaker switches 224, a central location for sensing which electrical loads are electrically connected to the first electric machine 56 is provided.

In some implementations, the load state data includes a runtime indicator indicative of a predetermined time in which at least one of the one or more electrical loads of the hybrid electric system anticipate increasing or decreasing to a power level consumption level that exceeds a predetermined threshold. In such implementations, the torque output of the engine is controlled based at least in part on whether the at least one of the one or more electrical loads anticipates increasing or decreasing to the power level consumption level that exceeds the predetermined threshold.

For instance, suppose the aircraft 10 (FIG. 1) has a flight control system configured to assist a pilot during takeoff and landings and that the flight control system receives electrical power from the first electric machine 56. Further suppose that a pilot has successfully taken off and is on the verge of beginning a cruise phase of the flight. Additionally suppose that the flight control system, recognizing that the pilot has significantly reduced the climb rate of the aircraft 10 and steadied the altitude, has scheduled the flight control system to reduce its power mode during the cruise phase, e.g., to enter a sleep power mode. As such, the runtime indicator may indicate that the flight control system is anticipated to reduce its power consumption level, e.g., when it switches from active mode to sleep mode. If the drop in the power level consumption of the flight control system exceeds the predetermined threshold, then the torque output of the engine is controlled based at least in part on the anticipated power change caused by the flight control system switching power modes.

Figure 13:
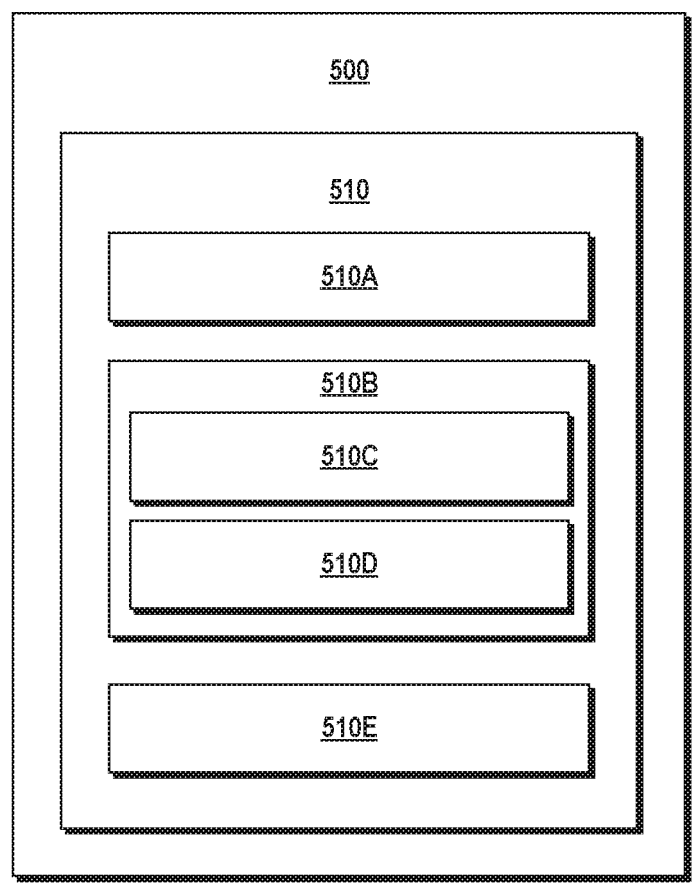
FIG. 13 provides an example computing system according to example embodiments of the present disclosure.

FIG. 13 provides an example computing system 500 according to example embodiments of the present disclosure. The computing system 500 can be used for the engine controller 101 or the system controller 70 of the hybrid electric propulsion system 50, for example. The computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, the operations for operating a hybrid electric propulsion system (e.g., method (300)), as described herein, and/or any other operations or functions of the one or more computing device(s) 510. Accordingly, the method 300 may be a computer-implemented method, such that each of the steps of the exemplary method (300) are performed by one or more computing devices, such as the exemplary computing device 510 of the computing system 500. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include data indicative of power flows, data indicative of power demands of various loads in a hybrid electric propulsion system, data indicative of operational parameters of the hybrid electric propulsion system, including of a turbomachine of the hybrid electric propulsion system, data indicative of a maintenance operation of the hybrid electric propulsion system, data indicative of an operation mode of the hybrid electric propulsion system, including of a turbomachine of the hybrid electric propulsion system, etc.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external devices, such as an external remote control, can be configured to receive one or more commands from the computing device(s) 510 or provide one or more commands to the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hybrid electric system, comprising:
an engine configured to generate a torque output;
an electric machine operatively coupled with the engine and configured to generate electrical power when driven by the engine;
one or more electrical loads selectively electrically connectable with the electric machine and configured to receive electrical power from the electric machine when electrically connected thereto;
an engine controller configured to control the engine and communicatively coupled with the one or more electrical loads, the engine controller configured to:
receive load state data associated with the one or more electrical loads, wherein the load state data comprises a runtime indicator indicative of a time period in which the one or more electrical loads are anticipated to electrically connect to or electrically disconnect from the electric machine;
determine, based on the load state data, whether a load change on the engine is anticipated; and
generate a control command based at least in part on whether the load change on the engine is anticipated.

2. The hybrid electric system of claim 1, wherein the control command is representative of instructions for changing the torque output of the engine.

3. The hybrid electric system of claim 2, wherein the engine controller is further configured to:
communicate the control command to one or more components of the engine for changing the torque output of the engine.

4. The hybrid electric system of claim 3, wherein the one or more components of the engine comprise a fuel control device configured to selectively control a fuel flow to the engine, and wherein the control command includes instructions for controlling the fuel control device to selectively control the fuel flow to the engine.

5. The hybrid electric system of claim 4, wherein if the load change anticipated on the engine is a load decrease, the control command communicated to the one or more components of the engine includes instructions for controlling the fuel control device to reduce the fuel flow to the engine.

6. The hybrid electric system of claim 1, wherein the runtime indicator is indicative of a predetermined time in which at least one of the one or more electrical loads of the hybrid electric system anticipate electrically connecting to or disconnecting from the electric machine.

7. The hybrid electric system of claim 6, wherein the engine controller is further configured to:
access a database that associates each electrical load of the hybrid electric system that is electrically connectable with the electric machine with an associated load; and
ascertain the associated load associated with the at least one of the one or more electrical loads that is anticipated to be electrically connected to or disconnected from the electric machine;
wherein the control command is generated based at least in part on the associated load associated with the at least one of the one or more electrical loads that is anticipated to be electrically connected to or disconnected from the electric machine.

8. The hybrid electric system of claim 1, wherein the load state data associated with the one or more electrical loads is sensed by sensing devices associated with the one or more electrical loads.

9. The hybrid electric system of claim 1, wherein the hybrid electric system is a hybrid electric propulsion system for an aircraft.

10. The hybrid electric system of claim 9, wherein the one or more electrical loads comprise a second electric machine, and wherein the hybrid electric propulsion system for the aircraft comprises:
a first propulsor operatively coupled with the engine and configured to produce thrust for the aircraft when driven by the engine; and
a second propulsor operatively coupled with the second electric machine and configured to produce thrust for the aircraft when driven by the second electric machine.

11. A method for operating a hybrid electric system, the method comprising:
receiving, by an engine controller of an engine, load state data associated with one or more electrical loads that are selectively electrically connectable with an electric machine operatively coupled with the engine, the electric machine being configured to generate electrical power when driven by the engine, wherein the load state data comprises a runtime indicator indicative of a time period in which the one or more electrical loads are anticipated to electrically connect to or electrically disconnect from the electric machine;
determining, by the engine controller, whether a load change on the engine is either anticipated or present based at least in part on the load state data; and
controlling, by the engine controller, a torque output of the engine based at least in part on whether the load change on the engine is either anticipated or present.

12. The method of claim 11, wherein controlling, by the engine controller, the torque output of the engine based at least in part on whether the load change on the engine is either anticipated or present comprises adjusting a fuel flow to the engine.

13. The method of claim 12, wherein the fuel flow to the engine is reduced prior to the load change on the engine.

14. The method of claim 11, wherein the hybrid electric system is a hybrid electric propulsion system for an aircraft, and wherein the one or more electrical loads comprise a circuit breaker and an aircraft system load selectively electrically connectable with the circuit breaker, and wherein the load state data of the aircraft system load is sensed at the circuit breaker.

15. The method of claim 11, wherein the runtime indicator is indicative of a predetermined time in which at least one of the one or more electrical loads of the hybrid electric system anticipate increasing or decreasing to a power level consumption level that exceeds a predetermined threshold, and wherein the torque output of the engine is controlled based at least in part on whether the at least one of the one or more electrical loads anticipates increasing or decreasing to the power level consumption level that exceeds the predetermined threshold.

16. A system comprising:
an engine configured to generate a torque output;
an electric machine mechanically coupled with the engine and configured to generate electrical power when driven by the engine;
one or more electrical loads selectively electrically connectable with the electric machine and configured to receive electrical power therefrom when electrically connected;
an engine controller configured for controlling the engine, the engine controller communicatively coupled with the one or more electrical loads, the engine controller configured to:
receive load state data associated with the one or more electrical loads, wherein the load state data comprises a runtime indicator indicative of a time period in which the one or more electrical loads are anticipated to electrically connect to or electrically disconnect from the electric machine;
determine, based on the load state data, whether a load change on the engine is present; and
generate a control command based at least in part on whether the load change on the engine is present.

17. The system of claim 16, wherein the control command is representative of instructions for changing the torque output of the engine, and wherein the engine controller is further configured to:
communicate the control command to the engine.

18. The system of claim 16, wherein the engine controller is further configured to:
calculate, based on load state data from a previous time step, a baseline toque load on the engine;
calculate, based on the load state data from a current time step, a current toque load on the engine; and determine the load change on the engine based at least in part on the baseline torque load and the current torque load on the engine.

19. The system of claim 16, wherein the load state data comprises a change indicator indicative of at least one of the one or more electrical loads of the system that have been electrically connected to or disconnected from the electric machine within a predetermined interval, and wherein the control command is generated based at least in part on the change indicator.

20. The system of claim 16, wherein the one or more electrical loads comprise a circuit breaker electrically coupled with at least one other electrical load of the one or more electrical loads, the circuit breaker comprising at least one breaker switch associated with the at least one other electrical load of the one or more electrical loads, and wherein the load state data associated with the one other of the one or more electrical loads is sensed at the at least one breaker switch.

* * * * *